United States Patent
Martin

(10) Patent No.: US 12,378,141 B2
(45) Date of Patent: *Aug. 5, 2025

(54) METHOD AND SYSTEM FOR THE REMEDIATION OF AQUATIC FACILITIES

(71) Applicant: Truox, Inc., Alpine, WY (US)

(72) Inventor: Roy W. Martin, Naples, FL (US)

(73) Assignee: Truox, Inc., Naples, FL (US)

( * ) Notice: Subject to any disclaimer, the term of this patent is extended or adjusted under 35 U.S.C. 154(b) by 408 days.

This patent is subject to a terminal disclaimer.

(21) Appl. No.: 18/111,656

(22) Filed: Feb. 20, 2023

(65) Prior Publication Data
US 2023/0249996 A1 Aug. 10, 2023

Related U.S. Application Data

(63) Continuation-in-part of application No. 17/988,963, filed on Nov. 17, 2022, which is a
(Continued)

(51) Int. Cl.
*C02F 1/76* (2023.01)
*C02F 1/00* (2023.01)
(Continued)

(52) U.S. Cl.
CPC ............... *C02F 1/76* (2013.01); *C02F 1/008* (2013.01); *C02F 1/4674* (2013.01); *C02F 1/686* (2013.01);
(Continued)

(58) Field of Classification Search
CPC .... C02F 1/76; C02F 1/008; C02F 1/00; C02F 1/685; C02F 1/766; C02F 1/66;
(Continued)

(56) References Cited

U.S. PATENT DOCUMENTS

| 4,044,103 A | 8/1977 | Mollard |
| 4,224,154 A | 9/1980 | Steininger |

(Continued)

FOREIGN PATENT DOCUMENTS

| BR | 9605603 | 8/1998 |
| BR | 9605603 A1 | 8/1998 |

(Continued)

OTHER PUBLICATIONS

EPA Technical Guidance Manual, Disinfection Profiling and Benchmarking, Office of Water, Epa 815-R-20-003, Jun. 2020, pp. 1-162.
(Continued)

*Primary Examiner* — Akash K Varma
(74) *Attorney, Agent, or Firm* — Jeffrey S. Melcher; Melcher Patent Law PLLC

(57) ABSTRACT

The invention relates to a method and system for the continuous treatment of the water of an aquatic facility using an integrated process control system to control a mixed halogen-based treatment comprising chlorine dioxide and a free halogen. The integrated process control system provides versatile control the chlorine dioxide and/or free halogen while employing in-situ generation of chlorine dioxide.

20 Claims, 8 Drawing Sheets

Related U.S. Application Data continuation-in-part of application No. 17/866,823, filed on Jul. 18, 2022, now Pat. No. 12,286,370, which is a continuation-in-part of application No. 17/571,586, filed on Jan. 10, 2022, now Pat. No. 11,999,633, which is a continuation-in-part of application No. 17/205,316, filed on Mar. 18, 2021, now Pat. No. 12,037,263.

(60) Provisional application No. 63/138,618, filed on Jan. 18, 2021, provisional application No. 63/013,007, filed on Apr. 21, 2020.

(51) Int. Cl.
*C02F 1/32* (2023.01)
*C02F 1/467* (2023.01)
*C02F 1/68* (2023.01)
*C02F 103/42* (2006.01)

(52) U.S. Cl.
CPC .......... *C02F 1/766* (2013.01); *C02F 2103/42* (2013.01); *C02F 2209/006* (2013.01); *C02F 2209/02* (2013.01); *C02F 2209/04* (2013.01); *C02F 2209/06* (2013.01); *C02F 2209/29* (2013.01); *C02F 2209/44* (2013.01); *C02F 2303/04* (2013.01)

(58) Field of Classification Search
CPC .... C02F 1/68; C02F 1/70; C02F 1/686; C02F 1/763; C02F 1/4674; C02F 2103/42; C02F 2209/005; C02F 2209/06; C02F 2209/29; C02F 2209/04; C02F 2209/003; C02F 2209/006; C02F 2209/02; C02F 2209/05; C02F 2209/44; C02F 2303/04
USPC ............... 210/754, 96.1, 143, 739, 743, 742
See application file for complete search history.

(56) References Cited

U.S. PATENT DOCUMENTS

| | | | |
|---|---|---|---|
| 4,414,180 A * | 11/1983 | Fisher | C01B 11/024 422/186 |
| 4,456,511 A * | 6/1984 | Fisher | B01J 19/122 204/157.48 |
| 6,824,756 B2 | 11/2004 | Rosenblatt | |
| 6,855,294 B2 | 2/2005 | Taylor | |
| 7,261,821 B2 | 8/2007 | Beardwood | |
| 7,311,884 B2 | 12/2007 | Brownfield | |
| 7,407,641 B2 | 8/2008 | Cowley | |
| 7,465,412 B2 | 12/2008 | Pickens | |
| 7,504,074 B2 | 3/2009 | Martens | |
| 7,754,057 B2 | 7/2010 | O-Leary | |
| 7,833,392 B2 | 11/2010 | Nanjundiah | |
| 7,922,933 B2 | 4/2011 | Martin | |
| 7,927,509 B2 | 4/2011 | Martin | |
| 7,964,138 B2 | 7/2011 | Richrdson | |
| 7,976,725 B2 | 7/2011 | Martin | |
| 8,088,300 B2 | 1/2012 | Byrne | |
| 8,211,296 B2 | 7/2012 | Angelilli | |
| 9,175,208 B2 | 11/2015 | Thompson | |
| 9,521,841 B2 | 12/2016 | Goda | |
| 9,656,891 B2 | 5/2017 | Martin | |
| 9,675,065 B2 | 6/2017 | Martin | |
| 10,427,959 B2 | 10/2019 | Martin | |
| 10,669,173 B2 | 6/2020 | Fujiwara et al. | |
| 10,807,882 B2 | 10/2020 | Lawryshyn et al. | |
| 11,235,975 B2 | 2/2022 | Martin | |
| 11,535,541 B2 * | 12/2022 | Gupta | C01B 11/026 |
| 2002/0014463 A1 * | 2/2002 | Iverson | C02F 5/083 210/749 |
| 2006/0088498 A1 | 4/2006 | Martin | |
| 2006/0131245 A1 * | 6/2006 | Dennis | C02F 1/008 210/746 |
| 2007/0193958 A1 | 8/2007 | Martin | |
| 2010/0189630 A1 * | 7/2010 | Martin | C01B 11/024 423/477 |
| 2011/0000860 A1 * | 1/2011 | Bland | C01B 11/024 204/157.48 |
| 2011/0288049 A1 * | 11/2011 | Blandford | A01N 59/00 252/175 |
| 2012/0207858 A1 | 8/2012 | Martin | |
| 2013/0126403 A1 | 5/2013 | Kilawee | |
| 2013/0334113 A1 | 12/2013 | Erlich | |
| 2014/0322349 A1 | 10/2014 | Martin | |
| 2015/0041136 A1 | 2/2015 | Martin | |
| 2015/0060370 A1 | 3/2015 | Martin | |
| 2015/0065403 A1 | 3/2015 | Martin | |
| 2015/0196027 A1 | 7/2015 | Martin | |
| 2015/0216874 A1 | 8/2015 | Martin | |
| 2016/0032173 A1 | 2/2016 | Martin | |
| 2017/0105412 A9 | 4/2017 | Martin | |
| 2018/0099882 A1 | 4/2018 | Martin | |
| 2019/0055146 A1 | 2/2019 | Ecolab | |
| 2019/0187089 A1 | 6/2019 | Endress | |
| 2019/0194047 A1 | 6/2019 | Martin | |
| 2019/0300398 A1 * | 10/2019 | Martin | C02F 1/32 |
| 2020/0123033 A1 | 4/2020 | Martin | |
| 2020/0239240 A1 | 4/2020 | Martin | |
| 2020/0189944 A1 | 6/2020 | Martin | |
| 2020/0239340 A1 | 7/2020 | Martin | |
| 2020/0319621 A1 | 10/2020 | Roy | |
| 2020/0346948 A1 | 11/2020 | Martin | |
| 2020/0354218 A1 | 11/2020 | Martin | |
| 2021/0323838 A1 | 10/2021 | Martin | |
| 2022/0127164 A1 | 4/2022 | Martin | |
| 2022/0240506 A1 | 8/2022 | Martin | |
| 2023/0144546 A1 | 5/2023 | Potucek | |

FOREIGN PATENT DOCUMENTS

| | | |
|---|---|---|
| CA | 2765637 | 7/2013 |
| CA | 3180548 A1 | 10/2021 |
| CA | 3206777 A1 | 7/2022 |
| CN | 202758205 | 2/2013 |
| CN | 202758205 A | 2/2013 |
| WO | 2021/216347 | 10/2021 |
| WO | 2022/155104 | 7/2022 |

OTHER PUBLICATIONS

Chlorine Contact Time for Small Water Systems, Washington State Department of Health, 2 pages (Year: 2016).
Written Opinion and search report issued in PCT/US2022/011892, Mar. 22, 2022, pp. 1-13.
Written Opinion and search report issued in PCT/US2024/27862, Nov. 15, 2023, pp. 1-16.
European Search Report issued in European Patent Application No. 21793364.7, Jan. 31, 2024, pp. 1-9.
Written Opinion and search report issued in corresponding PCT/US2021/027441, Jul. 9, 2021, pp. 1-25.

* cited by examiner

METHOD AND SYSTEM FOR THE REMEDIATION OF AQUATIC FACILITIES

FIELD OF INVENTION

The invention relates to a method and system for the continuous treatment of the water of an aquatic facility using an integrated process control system to control a mixed halogen-based treatment comprising chlorine dioxide and a free halogen. The integrated process control system provides versatile control the chlorine dioxide and/or free halogen while employing in-situ generation of chlorine dioxide.

BACKGROUND

Free chlorine and free bromine are common sanitizers for the treatment of water at aquatic facilities. While effective at controlling bacteria counts in the water, they have limited efficacy against waterborne pathogens that are resistant to the sanitizers such as *Cryptosporidium*. Free halogens also form undesirable disinfection byproducts (DBPs) that foul the air, cause corrosion, irritation to skin and respiratory system.

Along with chlorine resistant microbiological organisms like *Cryptosporidium*, other bacterial organisms are chlorine resistant and can form bio-films within the conduit (piping) of the pools circulating system. Some non-limiting examples include: *Pseudomonas aeruginosa* and *Enterococcus faecium*.

The Centers for Disease Control and Prevention has reported waterborne pathogens such as *Cryptosporidium* are accountable for nearly 80% of all Recreational Water Illness (RWI) in the United States. Combined with bacterial infections and virus, other waterborne pathogens that are resistant to chlorine and/or are embedded in a protective biofilm account for nearly 100% of all Recreational Water Illness (FIG. 1).

Chlorine dioxide is favored over many oxidizing biocides due to its biocide efficacy over a broad pH range, low use rate, biofilm penetration and high selectivity in contaminated water.

In order to ensure aquatic facilities are properly protected from waterborne pathogens, there is a need for controlling the continuous treatment of the water even while the pool is being used by humans.

Continuous treatment is necessary due to the fact that aquatic facilities that have been compromised by a waterborne pathogen will not know they have been compromised until symptoms are identified and confirmed often many days or even weeks later. By the time confirmation is made, the pathogen can spread to hundreds or even thousands of people who used the aquatic facility and/or have spread the pathogen to other aquatic facilities thereby propagating the spread of infection. Implementing an automated system that continuously treats the water of an aquatic facility with a safe level of effective treatment would essential eliminate nearly 100% of all infections resulting from waterborne pathogens as defined by the Centers for Disease Control and Prevention.

U.S. Pat. Nos. 7,922,933, 7,927,509, and 7,976,725 which are herein incorporated by reference in their entirety, disclose a cyclic process for the in-situ generation of chlorine dioxide. The cyclic process utilizes bromide ions that are activated by an oxidant to produce free bromine. The free bromine oxidizes chlorite ions producing chlorine dioxide. Chlorine dioxide inactivates microbiological organisms (i.e. *Cryptosporidium*). During this process the free bromine and at least some portion of the chlorine dioxide are reduced back to bromide ions and chlorite ions respectively which are recycled back to free bromine and chlorine dioxide utilizing the cyclic process.

My earlier U.S. Published Patent Application Nos. 2019-0300398 and 2020-0346948, which are herein incorporated by reference in their entirety, disclose methods for in-situ generation and stabilization of chlorine dioxide in the water of an aquatic facility using UV activation of chlorite ions.

My earlier U.S. Published Patent Application Nos. 2021-0323838 and 2022-0127164, which are herein incorporated by reference in their entirety, disclose methods for in-situ generation and stabilization of chlorine dioxide in the water of an aquatic facility.

Co-pending application Ser. Nos. 17/571,586, 17/988,963, 17/866,823 and 17/205,316 disclose methods and a system for controlling remediation cycles, more specifically "daily remediation" and "rapid recovery shock". The referenced remediation cycles are limited to periods when the aquatic facility is closed to bathers so the remediation can take place and be terminated before re-opening the pool for use by humans.

There is a need for controlling continuous treatment that can safely and effectively eliminate 100% of infections resulting from waterborne pathogens as disclosed by the Centers for Disease Control and Prevention. The mixed halogen-based treatment substantially reduces the free halogen concentration in the water as well as its overall use reducing operating cost and formation of DBPs. The synergistic effects provided by controlling the mixed halogen-based treatment effectively eliminates the need for auxiliary treatments such as shock treatments, breakpoint chlorination, enzymes and the like. The ability to provide versatile control of both in-situ generation of chlorine dioxide and free halogen feed eliminates the need for chlorine dioxide generators, while minimizing DBPs concentrations in the water and air.

SUMMARY OF THE INVENTION

Objectives of the invention include mitigating nearly 100% of all Recreational Water Illness (RWI) as described by the Centers for Disease Control and Prevention. Furthermore, the invention substantially reduces the concentration of free halogen required to treat the water of the Aquatic Facility, and dramatically reduces the formation of combined chlorine and other disinfection by products (DBPs).

The objectives of the invention and other objectives can be obtained by a first embodiment which comprises a method for controlling the continuous treatment of water of an aquatic facility using mixed halogen-based treatment, the method comprising:

providing a system comprising at least one sanitizer sensor for measuring the relative concentration of free halogen in the water, a pH sensor for measuring the pH of the water, a temperature sensor for measuring the temperature of the water, and a chlorine dioxide sensor for measuring the concentration of chlorine dioxide in the water, the at least one sanitizer sensor, pH sensor, temperature sensor and chlorine dioxide sensor being interfaced with a programmable controller;

the programmable controller is interfaced with chemical feed systems that are in fluid contact with the water, resulting in an integrated process control system;

the integrated process control system providing versatile control of chlorine dioxide and free halogen concentrations by:

measuring the chlorine dioxide concentration by the chlorine dioxide sensor;

measuring the relative concentration of free halogen by the sanitizer sensor;

comparing the chlorine dioxide concentration to a chlorine dioxide set point;

comparing the free halogen concentration to a free halogen set point;

controlling the chlorine dioxide concentration using accelerated in-situ generation of chlorine dioxide and/or applying a chlorite donor to the water for in-situ generation of chlorine dioxide using UV activation of chlorite or hypobromous acid activation of chlorite;

controlling free halogen concentration by applying a free halogen donor to the water, and/or using accelerated in-situ generation of chlorine dioxide;

wherein accelerated in-situ generation of chlorine dioxide comprises the integrated process control system applying an acid, a free halogen and a chlorite donor to a conduit connected to the water;

allowing the acid, the free halogen and chlorite donor to react in the conduit to form chlorine dioxide and residual free halogen; and supplying the chlorine dioxide and residual free halogen from the conduit to the water of the aquatic facility.

The system in accordance with the first embodiment further comprising:

measuring the chlorine dioxide concentration and calculating a chlorine dioxide Ct value by the programmable controller;

sustaining the concentration of chlorine dioxide between 0.1 and 1.0 ppm until a targeted chlorine dioxide Ct value is achieved, and wherein the programmable controller records the time and the chlorine dioxide Ct value when the targeted chlorine dioxide Ct value is achieved, resets the chlorine dioxide Ct value to zero, then repeats the process.

Objectives of the invention can further be met by a system for controlling the continuous treatment of water of an aquatic facility using mixed halogen-based treatment, the system comprising:

at least one sanitizer sensor for measuring the relative concentration of free halogen in the water, a pH sensor for measuring the pH of the water, a temperature sensor for measuring the temperature of the water, and a chlorine dioxide sensor for measuring the concentration of chlorine dioxide in the water, the at least one sanitizer sensor, pH sensor, temperature sensor and chlorine dioxide sensor being interfaced with a programmable controller;

the programmable controller is interfaced with chemical feed systems that are in fluid contact with the water, resulting in an integrated process control system;

the integrated process control system providing versatile control of chlorine dioxide and free halogen concentrations by:

measuring the chlorine dioxide concentration by the chlorine dioxide sensor;

measuring the relative concentration of free halogen by the sanitizer sensor;

comparing the chlorine dioxide concentration to a chlorine dioxide setpoint;

comparing the free halogen concentration to a free halogen setpoint;

controlling the chlorine dioxide concentration using accelerated in-situ generation of chlorine dioxide and/or applying a chlorite donor to the water for in-situ generation of chlorine dioxide using UV activation of chlorite or hypobromous acid activation of chlorite;

controlling free halogen concentration by applying a free halogen donor to the water, and/or using accelerated in-situ generation of chlorine dioxide;

wherein accelerated in-situ generation of chlorine dioxide comprises the integrated process control system applying an acid, a free halogen and a chlorite donor to a conduit connected to the water;

allowing the acid, the free halogen and chlorite donor to react in the conduit to form chlorine dioxide and residual free halogen, and supplying the chlorine dioxide and residual free halogen from the conduit to the water of the aquatic facility.

The programmable controller calculates, records, and stores the chlorine dioxide Ct value of the water. The programmable controller can also display the chlorine dioxide Ct value. The programmable controller can be programmed to forecast the time to achieve the targeted chlorine dioxide Ct value of the water. The calculated chlorine dioxide Ct value can be based on the rolling average of the chlorine dioxide concentration. The chlorine dioxide Ct value is calculated at any desired interval, for example every 0.1 to 60 minutes. The chlorine dioxide Ct value can be calculated by:

$$\text{Chlorine dioxide Ct value} = [(\Sigma X_n) \div n] \times T$$

Where:

"$X_n$" is the chlorine dioxide concentration in mg/l (or ppm) recorded at a point in time since beginning the remediation cycle.

"n" is the number of chlorine dioxide values recorded over a period of time since beginning the remediation cycle.

"T" is the period of time (minutes) that has lapsed since beginning the remediation cycle.

Any suitable sanitizer sensor can be utilized, such as an ORP sensor or an amperometric sensor for measuring chlorine. The system preferably utilizes both ORP and amperometric sensor for measuring the relative concentration of sanitizer.

Accelerated in-situ generation of chlorine dioxide results in the production of chlorine dioxide within the conduit (33), which is an integral part of the pool water circulating system, using relatively dilute concentrations of chlorite. When accelerated in-situ generation of chlorine dioxide is initiated by the programmable controller, the controller activates the chemical feed systems to achieve localized high concentrations of chemicals in the conduit (33). The localized high concentrations of chemicals react resulting in efficient conversion of chlorite to chlorine dioxide in the conduit.

The chemicals comprise a source of free halogen (i.e. free chorine and/or free bromine), and acid source and a chlorite source. The concentration of free halogen (reported as $Cl_2$) and chlorite (reported as $ClO_2^-$) are in a molar ratio of between 0.5:2 to 2:1, more preferred 0.75:2 to 1.75:1 and most preferred 1:2 to 1:1 respectively.

The acid should be applied at a sufficient concentration to achieve a pH in the conduit (33) of between 2 to 7.5, more preferably 2.5 to 6 and most preferred 3 to 5.5. A pH sensor can optionally be inserted into the conduit downstream of the acid feed point and be interfaced with the programmable controller. The programmable controller can then adjust the feed rate of acid to achieve a targeted pH.

The molar ratio of free halogen (reported as $Cl_2$) to chlorite and pH can be optimized based on the lapsed time between the location of chemical feed to the time the water in the conduit is injected into the pool. The longer the lapsed time the more reaction time there is for in-situ generation of chlorine dioxide. In the case of shorter lapsed time periods, it may be advantageous to apply a higher molar ratio of free halogen to chlorite and lower the pH to below 5.5 when using free chlorine donor to maximize the concentration of hypochlorous acid thereby increasing the rate of reaction and subsequent formation of chlorine dioxide. Variable speed chemical feed pumps can be used to vary the molar ratio to achieve a targeted residual free halogen (to raise the free halogen in the treated water) or free chlorite (to induce in-situ generation of chlorine dioxide using UV activation or the cyclic process).

Optimizing the molar ratio of free halogen to chlorite and pH has demonstrated the ability to achieve a conversion of chlorite to chlorine dioxide of ≥70%, more preferred≥80% and most preferred≥90%.

By producing high concentrations of in-situ generated chlorine dioxide within the conduit, the process can be carried out safely without the need for expensive or potentially dangerous chlorine dioxide generators. FIG. 6 and FIG. 7 illustrate the rapid increase in chlorine dioxide concentration using accelerated in-situ generation of chlorine dioxide compared to in-situ generation of chlorine dioxide using the cyclic process (FIG. 2). The rapid buildup of chlorine dioxide results in a reduction in the time required to achieve the set range of chlorine dioxide concentration and the target chlorine dioxide Ct value.

The invention discloses a method comprising an integrated process control system that provides versatile control of mixed halogen-based treatment that can effectively mitigate nearly 100% of Recreational Water Illness as defined by the Centers for Disease Control and Prevention.

The ability to select individual methods or combined methods for the in-situ generation of chlorine dioxide (e.g. accelerated method, UV activation and/or cyclic process) and application of free halogen, the disclosed invention provides unprecedented control of mixed halogen-based treatment at low cost and safely without the need for costly and potentially dangerous chlorine dioxide generators.

The programmable controller can be configured to select the best option for controlling the mixed halogen-based treatment based on whether the swimming pool being treated is indoors or outdoors. Indoor aquatic facilities are best suited using the cyclic process for applying strictly in-situ generated chlorine dioxide as they are sheltered from the sun's UV. Whereas outdoor aquatic facilities can benefit from the UV activation of chlorite during daytime hours of operation. The programmable controller can be configured to differentiate between these conditions as well as select the best method of application of treatment based on the deviation from the various setpoints.

BRIEF DESCRIPTION OF THE DRAWINGS

FIG. 8 illustrates that UV activation and the cyclic process are two methods for converting chlorite donor to chlorine dioxide without contributing free halogen (HOX). Accelerated in-situ generation produces chlorine dioxide while contributing residual free halogen (HOX), the amount of free halogen being controlled by the efficiency of chlorite conversion and how much excess (shaded area) free halogen (HOX) is being applied. The stoichiometry of HOX to chlorite donor can be preset or can be altered in near real-time using variable speed chemical pumps. The programmable controller can be configured to compare the deviation from the setpoint (set range) of chlorine dioxide and free halogen and alter the stoichiometry to provide more or less free halogen while maximizing the efficiency of in-situ generation for chlorine dioxide.

DETAILED DESCRIPTION OF THE INVENTION

Figure 5:
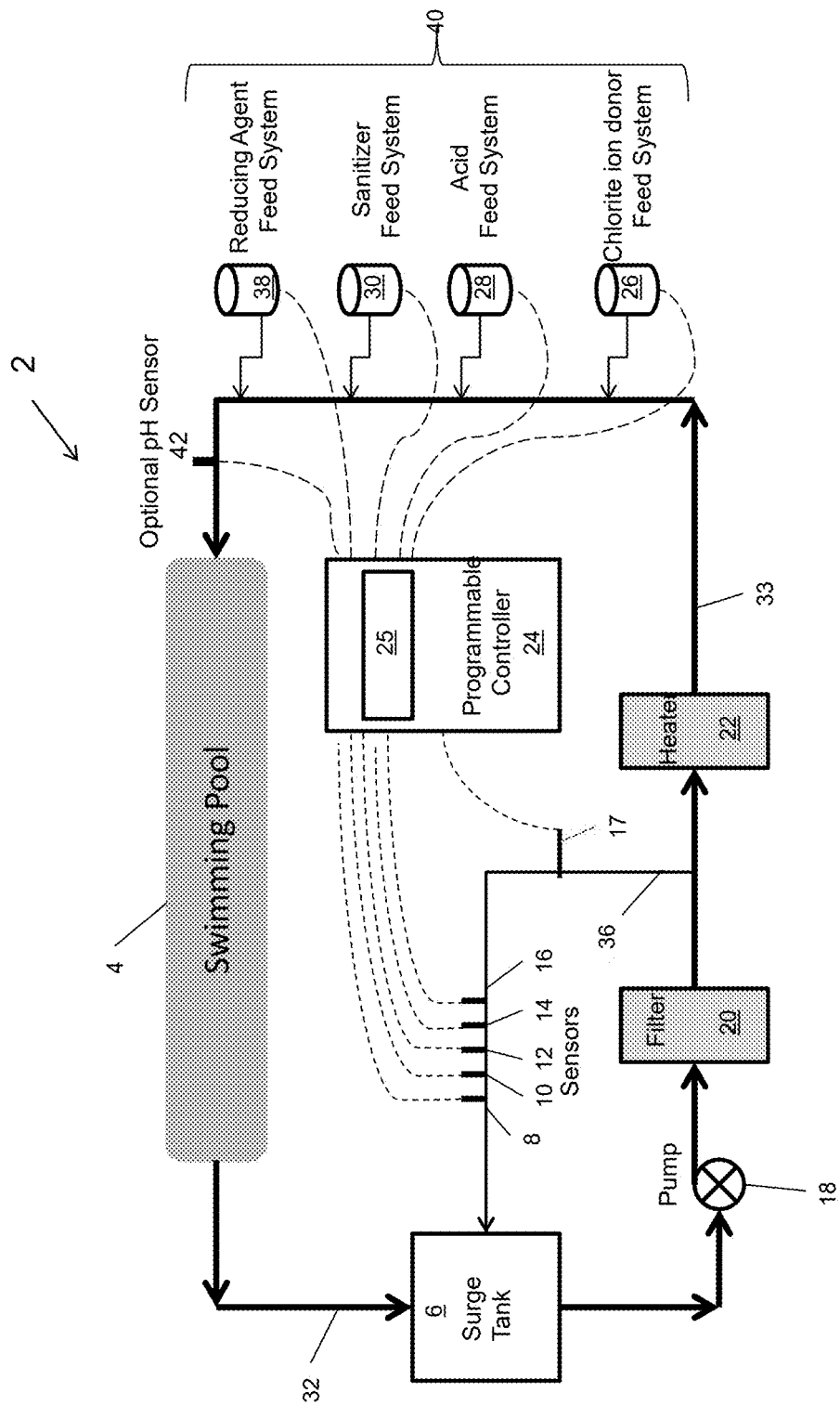
FIG. 5 illustrates the configuration of the integrated process control system as it relates to the circulating system of the aquatic facility. Conduit (33) in which accelerated in-situ generation of chlorine dioxide takes place in an integral part of the pools circulating system, while the pool (4) is where the majority of the in-situ generation of chlorine dioxide will occur as a result of UV activation of chlorite and/or the cyclic process.
Figure 6:
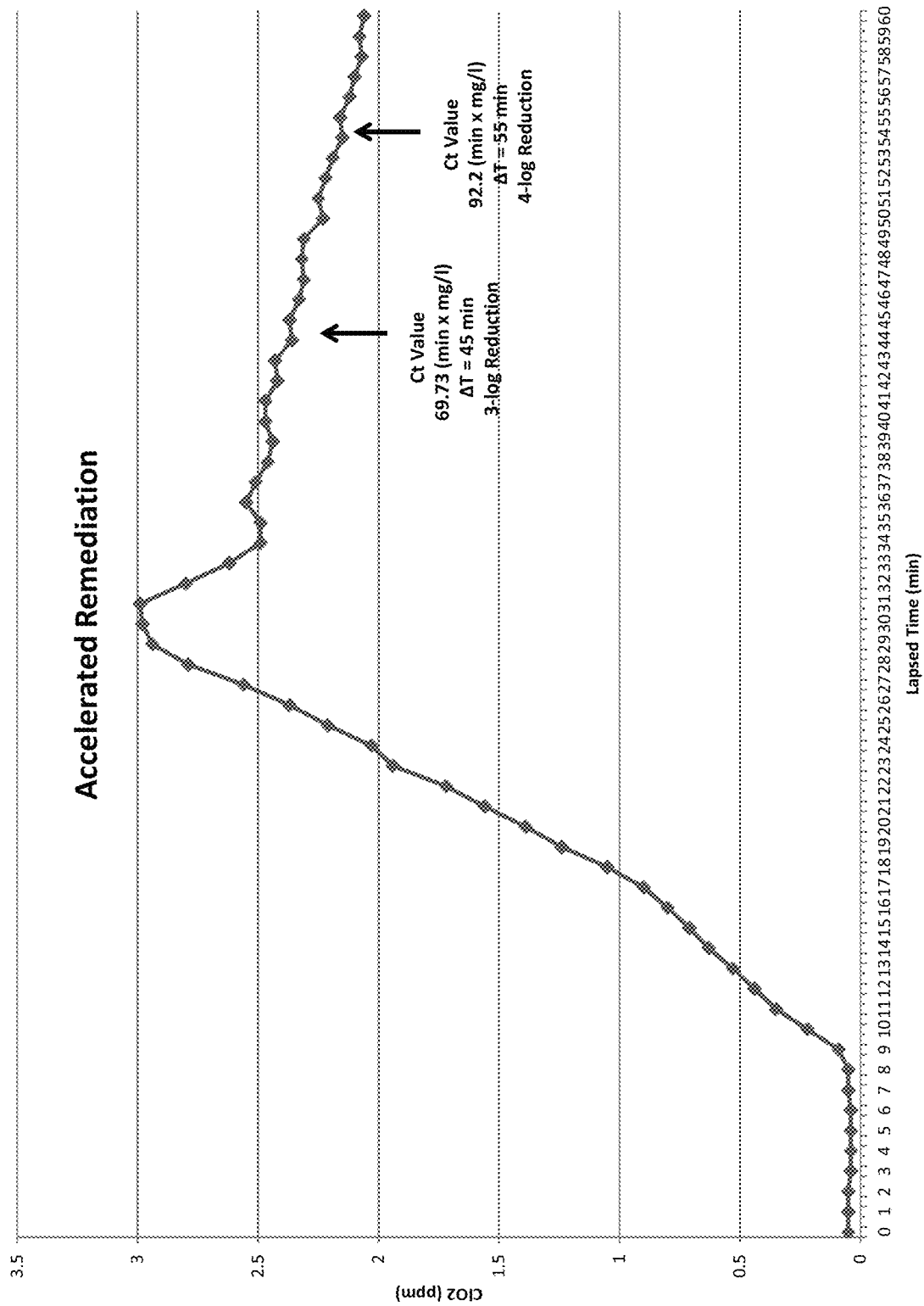
FIG. 6 and FIG. 7 illustrate the rapid increase in in-situ generated chlorine dioxide as a result of the accelerated in-situ generation of chlorine dioxide.
Figure 7:
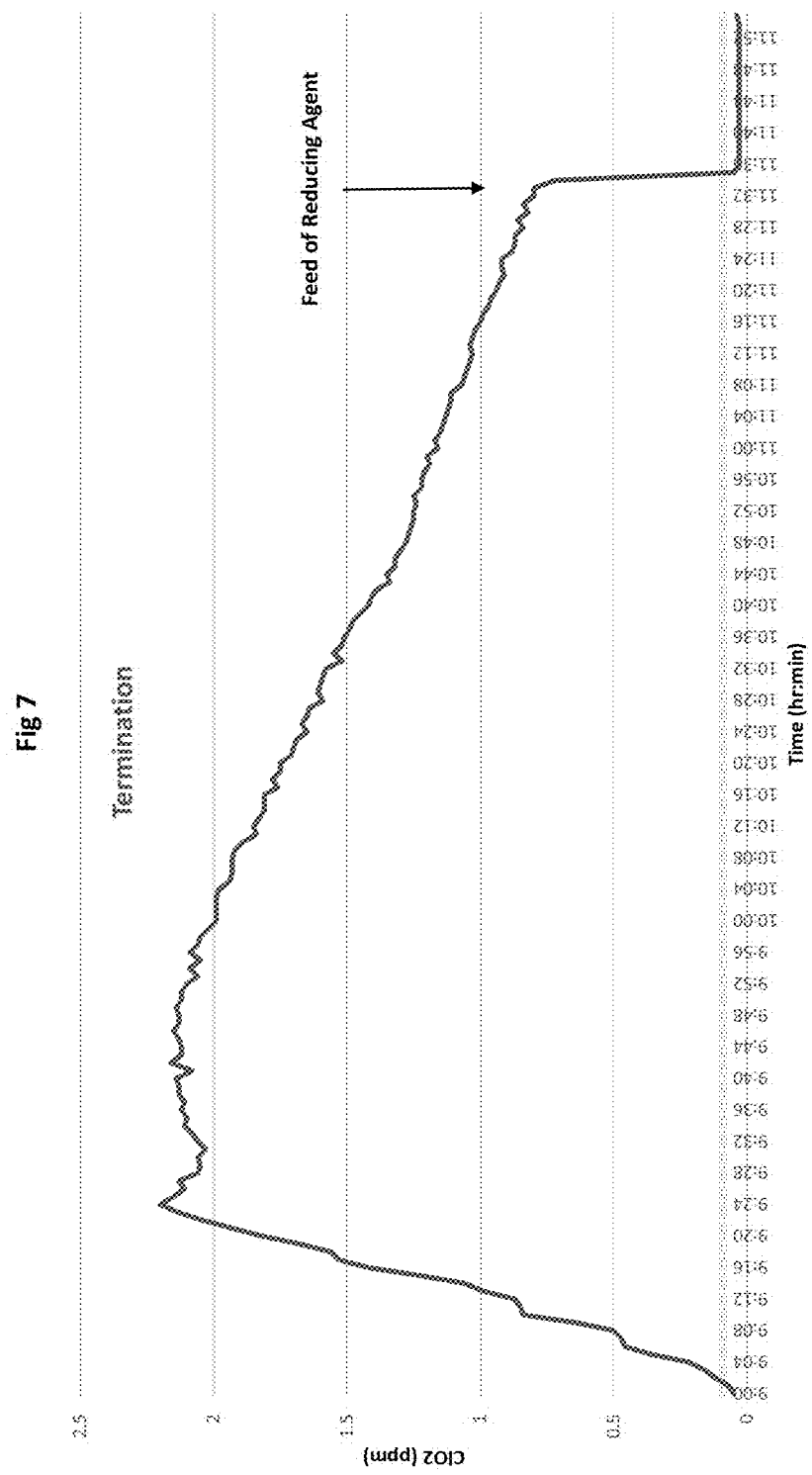
Figure 8:
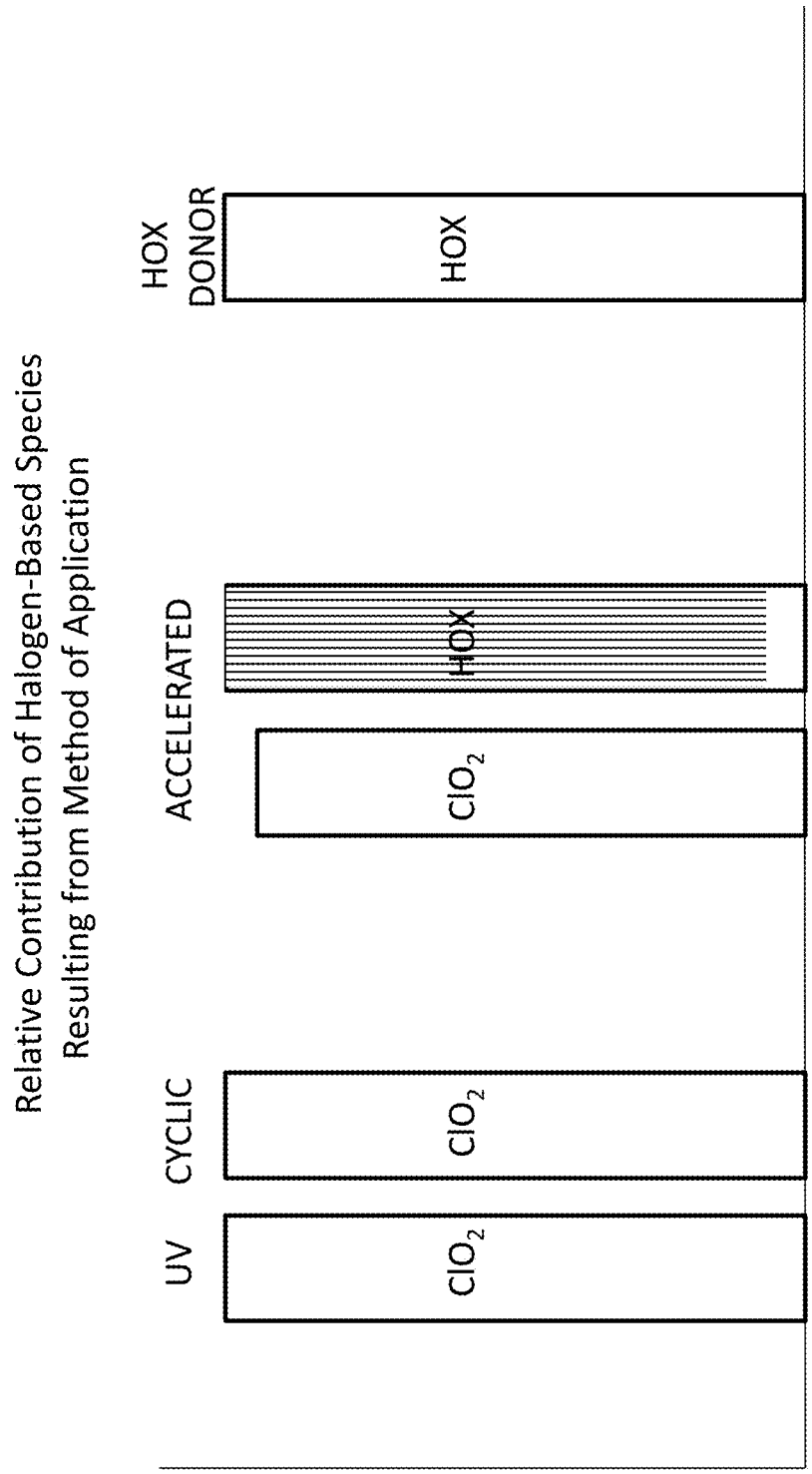
FIG. 8 illustrates the relative contribution of halogen-based species contributed to the treated water as a result of the method used for in-situ generation of chlorine dioxide and/or direct application of chlorite donor and/or free halogen (HOX) where "X" is either chlorine (Cl) or bromine (Br).

The invention will be explained with reference to attached non-limiting Figs. FIG. 5 illustrates an exemplary integrated process control system 2 for the continuous treatment of the water 4 in an aquatic facility. In an aquatic facility, the water 4, such as in a swimming pool, typically flows out of the pool through exit conduit 32 to a surge tank 6, water pump 18, filter 20, heater 22, and then back into the pool via return conduit 33. A chemical feed system 40 is connected to the water 2, such as through the conduit 32. Examples of chemical feed systems 40 include a sanitizer feed system 30 for supplying sanitizer such as free halogen to the water 4, an acid feed system 28 for supplying chemicals to adjust or control the pH of the water 4, a chlorite donor feed system 26 for supplying chlorite ions to the water 4, and an optional reducing agent feed system 38 for supplying a reducing agent or other chemicals to the water 4.

A first sanitizer sensor 8 and a second sanitizer sensor 10 can be used to measure the relative concentration of sanitizer in the water 4. For example, the first sanitizer sensor 8 can be an ORP senor and the second sanitizer sensor 10 can be amperometric type sensor. A pH sensor 12 can be used to measure the pH of the water 4. A chlorine dioxide sensor 14 can be used to measure the concentration of chlorine dioxide in the water 4. A temperature sensor 16 can be used to measure the temperature of the water 4. A flow sensor 17 can be used to measure the water flow through the conduit 36 from which the sensors 8, 10, 12, 14, 16 and 17 are connected to sample the water 4.

A programmable controller 24 is used to control the water treatment of system 4. The chlorite donor feed system 26, the acid feed system 28 and the sanitizer feed system 30 are connected to and controlled by the programmable controller 24. The sensors 8, 10, 12, 14, 16 and 17 are connected to and provide measurements to the programmable controller 24.

The Florida Department of Health pH range for the water 4 of an aquatic facility is from 7.2 to 7.8 with the recommended range being 7.4 to 7.6. The programmable controller 24 automatically monitors and controls the pH to operate within these ranges using the pH sensor 12 and acid feed system 28. Due to the significant lag time between the time of feeding pH related chemicals (i.e. acid) from the acid feed system 28 and the time to return a representative sample for the pH sensor 12 to measure, control logic is used to minimize the potential for overfeed of the chemical. Examples of control logic is on/off control and time-proportioned control.

The Florida Department of Health Sanitizer range for chlorine (reported as $Cl_2$) sanitizer is from 1-10 ppm in pools and 2-10 ppm in spas. For bromine (reported as $Br_2$) the ranges are 1.5-10 ppm in pools and 3-10 ppm in spas.

During continuous treatment of the water using mixed halogen-based treatment the chlorine (reported as $Cl_2$) can be controlled at the low end of the range while meeting or exceeding the rate of kill of microbial organisms. The programmable controller will automatically control the chlorine dioxide to maintain a chlorine dioxide concentration within a preferred concentration between 0.1 to 1.0 ppm, more preferred 0.2 to 0.8 ppm and most preferred 0.3 to 0.6 ppm measured as $ClO_2$. The programmable controller will also control the free halogen concentration within a preferred concentration between 0.3 to 3 ppm, more preferred 0.4 to 2.5 ppm and most preferred 0.5 to 2.0 ppm reported as $Cl_2$. The relative concentration of free halogen is measured using the first or second sanitizer sensors 8 and 10 and applied using the sanitizer feed system 30. The concentration of chlorine dioxide is measured using the chlorine dioxide sensor 14 and applied by in-situ generation of chlorite using the chlorite donor feed system 26, or the sanitizer feed system 30, acid feed system 28 and chlorite donor feed system 26.

The chlorine dioxide Ct value (min×mg/l) can range from 1-500, more preferred 2-300, and most preferred 3-200. The optimum chlorine dioxide Ct value will depend on what is being remediated. The chlorine dioxide Ct value of ≤200 (mg/l×min) is typically sufficient to remediate *Cryptosporidium* (3-log reduction).

The programmable controller 24 tracks the chlorine dioxide concentration measured by the chlorine dioxide sensor 14 during the continuous treatment and calculates the rolling average (also referred to as a "moving average"). The rolling average is multiplied by the time that has lapsed measured in minutes to update the chlorine dioxide Ct value in real-time. The rolling average can be updated over any desired period of lapsed time. One preferred period of lapsed time ranges from 0.1 to 60 minutes, more preferred 0.2 to 30 minutes, and most preferred 0.5 to 10 minutes. The ability to frequently update the real-time chlorine dioxide Ct value allows the programmable controller to forecast the trend and project when the targeted chlorine dioxide Ct value will be reached. Once the targeted chlorine dioxide Ct value is achieved, the programmable controller records the chlorine dioxide Ct value and the time the chlorine dioxide Ct value was achieved. The programmable controller then resets the chlorine dioxide Ct value to zero (0) and repeats the process.

The programmable controller 24 can be configured to calculate, record, and store the chlorine dioxide Ct value. Optionally the controller 24 can display the chlorine dioxide Ct value on the display 25 and callout to a technician in the event of a successful or failed remediation cycle. Once the chlorine dioxide Ct value has been achieved, the programmable controller records the chlorine dioxide Ct value and the time the chlorine dioxide Ct value was achieved, resets the chlorine dioxide Ct value to zero (0), and then repeats the process.

When electrolysis of chloride salts is used to generate free halogen (sanitizer), additional acid may not be required for the accelerated in-situ generation of chlorine dioxide. Electrolysis produces chlorine gas ($Cl_2$) which hydrolyses to form hypochlorous acid (HOCl) and hydrochloric acid (HCl). The simultaneous chemical feed of free halogen and acid from an electrolysis device (chlorine generator) and chlorite donor achieve localized high concentrations in the conduit. Fluid dynamics within the conduit combine the high concentrations of chemicals to induce a high rate of reaction resulting in elevated concentrations of chlorine dioxide in the conduit without the feed of additional acid from the acid feed system 28. The optimization of acid feed may be further improved by implementing a pH sensor into the conduit 42 that is in fluid contact with the programmable controller that can automatically adjust the acid feed 28.

A reducing feed system 38 interfaced with the programmable controller 24 and in fluid contact with the water 4 of the aquatic facility provides the ability to feed a reducing agent exemplified by sodium thiosulfate in order to neutralize any excess sanitizer after a remediation cycle to address a known or suspected fecal release or an evening remediation as disclosed in the co-pending U.S. patent application Ser. Nos. 17/571,586, 17/988,963, 17/866,823 and 17/205,316.

Once the target chlorine dioxide Ct value is achieved the remediation cycle can be terminated. The programmable controller can be programmed to automatically feed a reducing agent to the water based on the excess residual chlorine dioxide, oxidizer and/or sanitizer in the water. The approximate concentrations of said residuals can be determined by either direct measurements utilizing amperometric and chlorine dioxide sensors and/or by calculation.

Calculated residuals can be determined by knowing the relative amounts of chlorite ions and oxidizer/sanitizer applied to the swimming pool. Knowing the relative amounts of each said chemical allows for approximating the amount of reducing agent needed to neutralize the excess residuals and accelerate the process of achieving compliance with the Dept of Health regulations to reopen the pool for use.

The following terms used throughout the specification have the following meanings unless otherwise indicated.

"A" or "an" means "at least one" or "one or more" unless otherwise indicated.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

As used herein, "setpoint" describes a targeted value (also referred to as "setpoint value") the programmable controller targets to control the concentrations of chlorine dioxide and free halogen.

As used herein, "set range" is synonymous with setpoint in that the setpoint value will be within the set range, while the set range includes tolerances around the setpoint that can alter the aggressiveness of the feed rate for the respective treatment. For example, if the chlorine setpoint is 1.0 ppm and the measured value falls to 0.9 ppm, the programmable controller may initiate a feed of chlorine donor for 3 seconds out of ever minute. However if the measured concentration of chlorine falls to 0.8 ppm, the programmable control may increase the feed rate of chlorine donor to 10 seconds out of every minute. Continuing, if the concentration of chlorine falls to 0.5 ppm, the programmable controller may set off an alarm to notify personnel of the condition, as well as feed chlorine donor continuously until the measured value increases to a value closer to the targeted setpoint, after which the programmable controller proportions the feed rate based on how far the measured value deviates from the setpoint, as illustrated. There will also be acceptable tolerances as they relate to values greater than the setpoint. This example illustrates how acceptable tolerances are used to provide for a "set range" as it pertains to the concentration of chlorine dioxide and free halogen.

As used herein, the term "aquatic facility" is used with reference to all structural components and equipment comprising an aqueous system used by humans for exercise, sports and/or recreation. Examples of aquatic facilities include but are not limited to: water parks, theme parks, swimming pools, spas, therapy pools, hot tubs and the like.

As used herein, the term "aqueous system" describes a body of water 4 that can be treated using the disclosed invention.

As used herein, "recreational water" is water 4 used by mammals (i.e. humans) for various activities such as swimming, exercise, water sports, recreation, physical therapy and diving. Examples of aqueous systems comprising recreational water include: swimming pools, hot tubs, feature pools, spas, water-park rides, therapy pools, diving wells etc.

As used herein the term "chlorine dioxide Ct value" is defined as the product of the average concentration of chlorine dioxide (mg/l) and time (minutes) of exposure to the chlorine dioxide. For example, if the average chlorine dioxide concentration of $ClO_2$ is determined to be 2.2 mg/l over a 20 minute period of time, the chlorine dioxide Ct value is calculated by multiplying the average concentration of chlorine dioxide by the time.

Chlorine dioxide Ct value=2.2 mg/l×20 min

Chlorine dioxide Ct value=44 (min×mg/l)

The chlorine dioxide Ct value can be targeted based on laboratory and/or field studies to achieve the desired level of inactivation. Comparatively, low chlorine dioxide Ct values (i.e. Ct=1 mg·min/l) may achieve a 6-log reduction in bacteria like *E. coli*, while higher chlorine dioxide Ct values (i.e. Ct=90 mg·min/l) may be required to reduce a parasite like *Cryptosporidium* by 3-log.

As used herein, "algorithm to calculate the chlorine dioxide Ct value" describes a mathematical equation for calculating the chlorine dioxide Ct value in near real-time. One example of a suitable algorithm for calculating the chlorine dioxide Ct value follows:

Chlorine dioxide Ct value=$[(\Sigma X_n)\div n]\times T$

Where:
"$X_n$" is the chlorine dioxide concentration in mg/l (or ppm) recorded at a point in time since beginning the remediation cycle.
"n" is the number of chlorine dioxide values recorded over a period of time since beginning the remediation cycle.
"T" is the period of time (minutes) that has lapsed since beginning the remediation cycle.

The algorithm calculates the chlorine dioxide Ct value over the period of the remediation cycle. The algorithm calculates the sum of all the chlorine dioxide values recorded. The sum is divided by the number of chlorine dioxide values to obtain the average chlorine dioxide concentration. The average chlorine dioxide concentration is then multiplied by the lapsed time (minutes) to calculate the chlorine dioxide Ct value (mg/l×min). The chlorine dioxide Ct value is updated in real-time by calculating the rolling average of the chlorine dioxide concentration, then multiplying the rolling average by the lapsed time (minutes) since beginning the remediation cycle.

As used herein, "rolling average" is the average chlorine dioxide concentration resulting from the accumulated (sum) chlorine dioxide concentrations (mg/l) divided by the number of chlorine dioxide measurements by the chlorine dioxide sensor 14 and recorded. The rolling average is used to provide a real-time chlorine dioxide Ct value by multiplying the rolling average by the lapsed time (i.e. number of minutes since beginning the calculation of the chlorine dioxide Ct value). The rolling average can be updated over any desired period of lapsed time. One preferred period of lapsed time ranges from 0.1 to 60 minutes, more preferred 0.2 to 30 minutes, and most preferred 0.5 to 10 minutes.

As used herein, the term "remediation cycle" describes the process of treating the water of an aquatic facility with mixed halogen-based treatment comprising chlorine dioxide and free halogen to obtain a targeted chlorine dioxide Ct value (min×mg/l) to achieve remediation. The water is continuously treated with mixed halogen-based treatment therefore the remediation cycle continuously repeats. The remediation cycle comprises: measuring the chlorine dioxide concentration and calculating a chlorine dioxide Ct value by the programmable controller; sustaining the concentration of chlorine dioxide between 0.1 to 1.0 ppm until a targeted chlorine dioxide Ct value is achieved, and the programmable controller records the time and the chlorine dioxide Ct value achieved, resets the chlorine dioxide Ct value to zero, then resumes calculating a chlorine dioxide Ct value, thereby repeating the remediation cycle.

As used herein, "accelerated in-situ generation of chlorine dioxide" describes delivering chemicals for the in-situ generation of chlorine dioxide into a conduit 33 of the circulating system to achieve localized high concentrations to accelerate the generation of chlorine dioxide. The localized high concentrations of chemicals interact resulting in higher conversion of chlorite to chlorine dioxide within the conduit. By accelerating the production rate of chlorine dioxide, the concentration of chlorine dioxide in the water of the aquatic facility is elevated in a short period of time when compared to in-situ generation using UV activation and/or the cyclic process.

As used herein, "localized high concentrations" refers to the concentration of chemicals used for the generation of chlorine dioxide within the conduit. The volume of water in the conduit is only a small portion of the volume of water in the swimming pool. When the said chemicals are applied to the conduit, the concentration in the conduit may be 100's of times higher than what will be achieved once the chemicals are dispersed in the large volume of water in the swimming pool. For example, a 100,000 gallon swimming pool is required to have a turnover every 6 hours or less to meet typical Dept of Health codes. A circulation rate of approximately 280 gpm is required. If the programmable controller is programmed to feed sufficient chemical to produce 5 ppm as $ClO_2$ based on the volume of water in the pool and the chemicals are feed over three minutes, the localized high concentrations within the conduit are sufficient to produce approximately 119 ppm as $ClO_2$. By utilizing accelerated in-situ generation of chlorine dioxide, localized high concentrations of reactant chemicals result in high conversion efficiency without the use of a chlorine dioxide generator.

Figure 1:
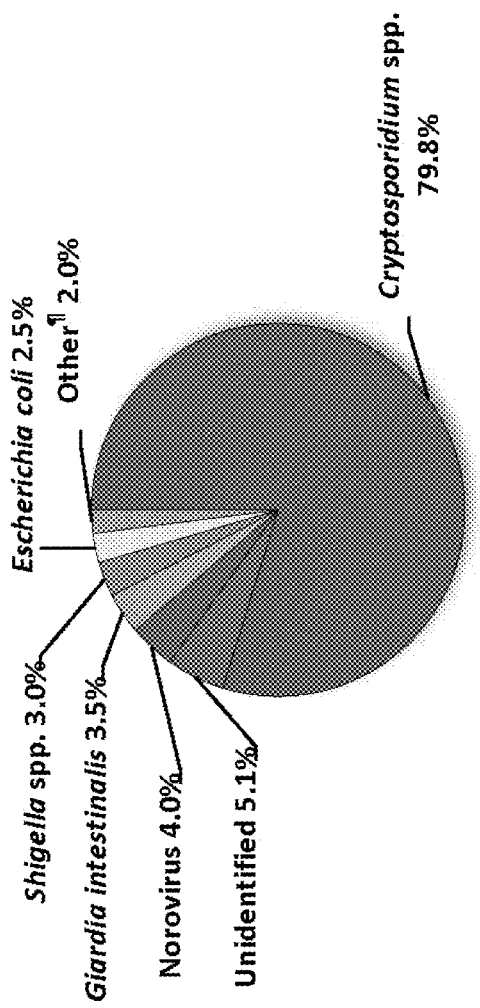
FIG. 1 illustrates the Etiology of microbial infections from treated swimming pools provided by the Centers for Disease Control and Prevention.
Figure 2:
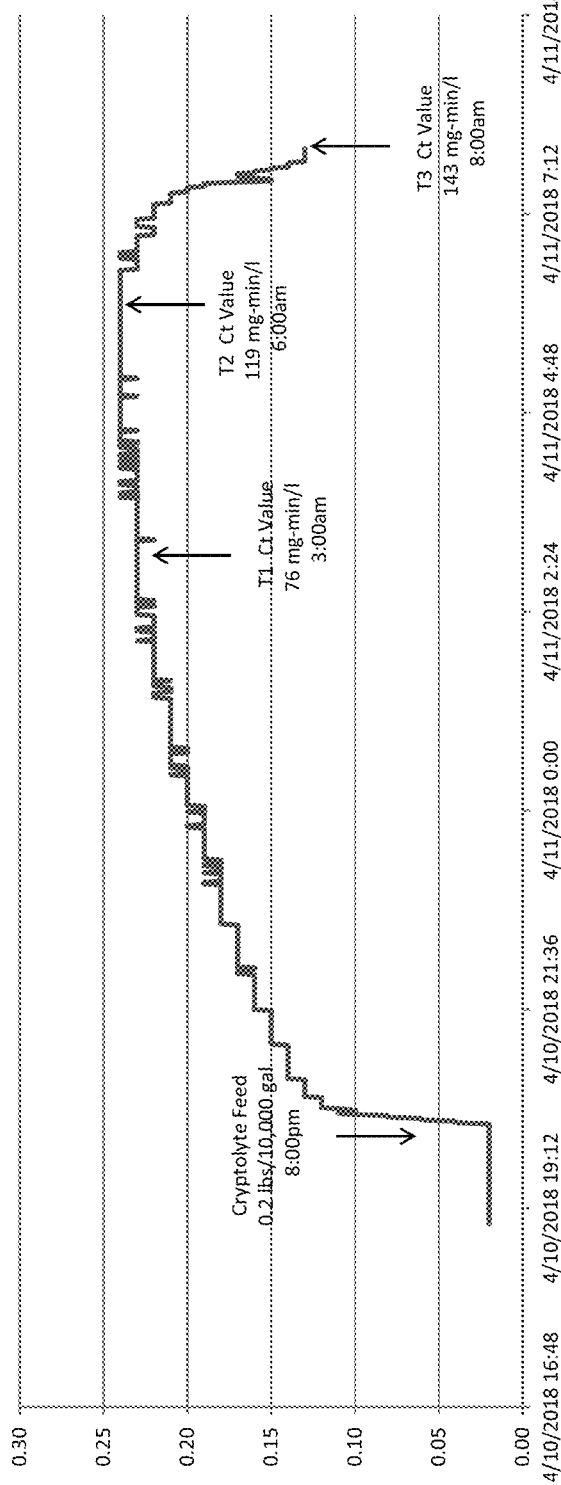
FIG. 2 illustrates the in-situ generation of chlorine dioxide using the cyclic process.
Figure 3:
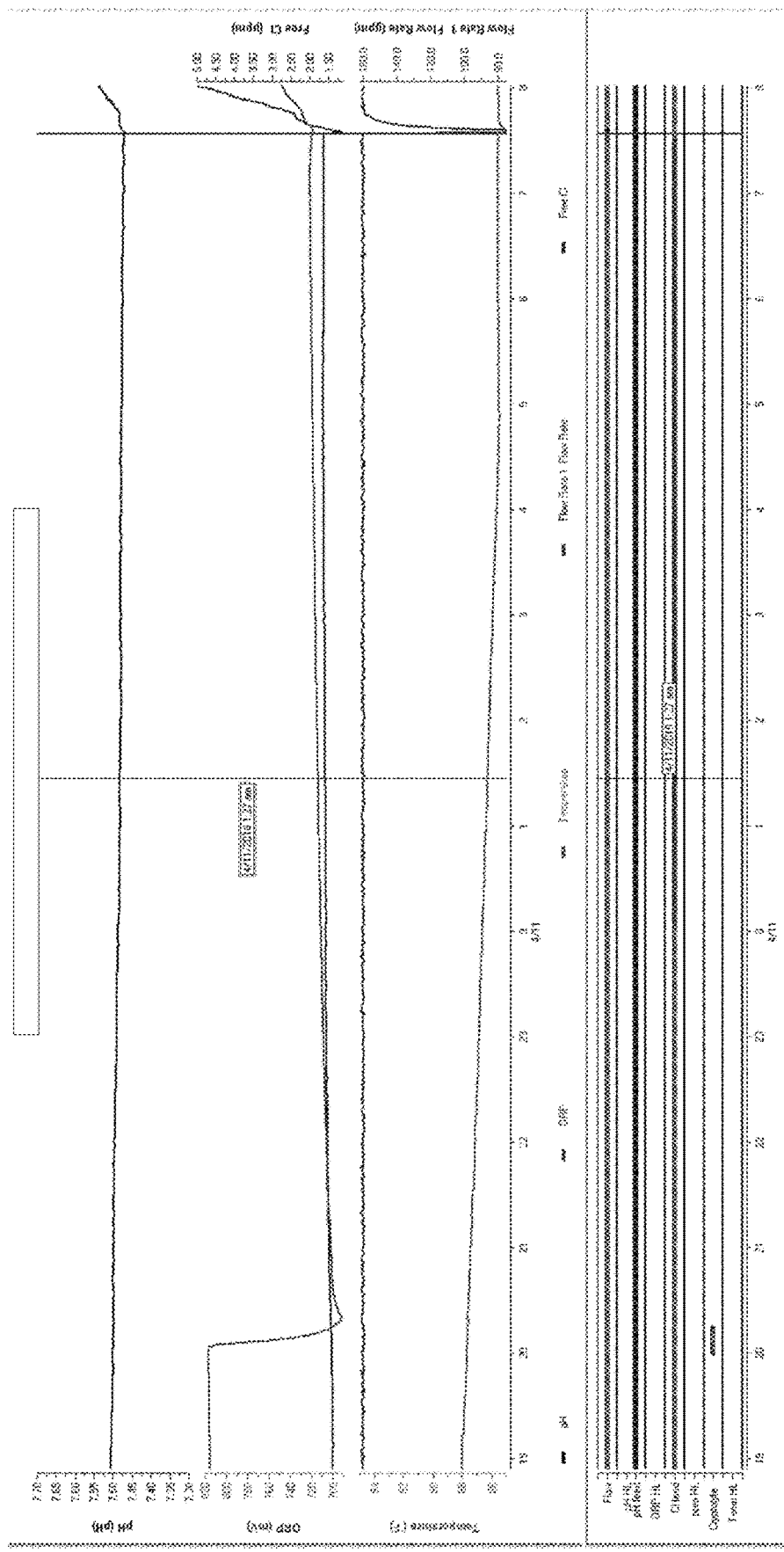
FIG. 3 is the events logs supporting FIG. 2 showing the application of Cryptolyte (sodium chlorite solution) and the effects on ORP.
Figure 4:
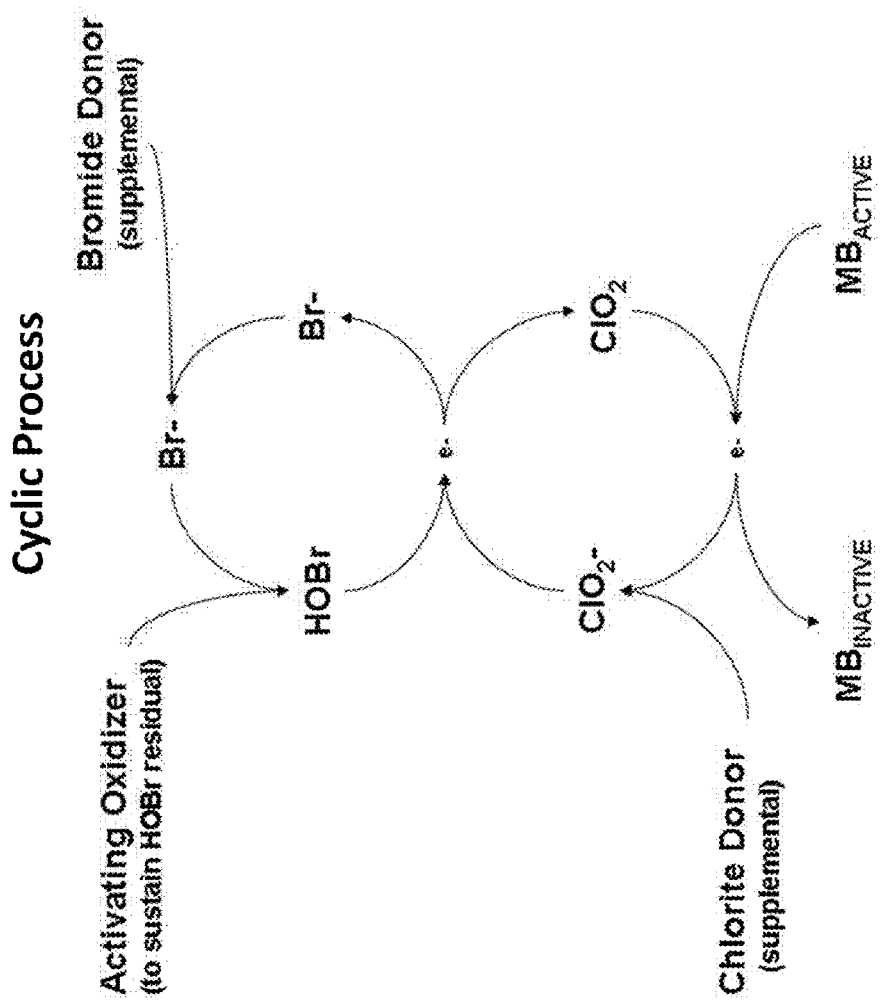
FIG. 4 illustrates a cyclic process for the in-situ generation of chlorine dioxide disclosed in the referenced prior art.

As used herein, the term "cyclic process" describes the in-situ generation of chlorine dioxide resulting from hypobromous acid activation of chlorite, followed by the recycling of substantially inert anions comprising bromide and chlorite. The bromide and chlorite are then oxidized into their oxyhalogen surrogates, exemplified by hypobromous acid and chlorine dioxide respectfully followed by reduction back to their respective anions, and where the process is repeated (FIG. 4). The cyclic process comprises activating bromide ions with the oxidant to produce free bromine, the free bromine oxidizes chlorite ions to produce chlorine dioxide, reducing at least some free bromine back to bromide ions and repeating the process. Chlorite ions resulting from the reduction of chlorine dioxide are also recycled back to chlorine dioxide in the cyclic process.

As used herein "hypobromous acid activation of chlorite" describes how the cyclic process in-situ generates chlorine dioxide from chlorite. The cyclic process as previously described in a multi-step process that makes efficient use of the chlorite. However, the in-situ generation of chlorine dioxide resulting from the cyclic process is the direct result of hypobromous acid activation of chlorite.

As used herein, "UV activation" and "UV activation of chlorite" is a method for in-situ generation of chlorine dioxide from chlorite that is especially suitable for outdoor pools during normal daylight hours when most recreational water facilities are being used by swimmers and bathers. The method exploits the benefits of sunlight's UV to accelerate the generation of chlorine dioxide. Addition of a chlorite donor to the aqueous system exposed to sunlight results in the in-situ generation of chlorine dioxide by ultraviolet (UV) light induced photolysis (decomposition) of chlorite ions according to the proposed stoichiometry:

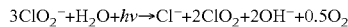

$$3ClO_2^- + H_2O + h\nu \rightarrow Cl^- + 2ClO_2 + 2OH^- + 0.5O_2$$

This method of in-situ generating chlorine dioxide is beneficial while the pool is in use by applying chlorite into the pool thru the return ports of the circulating system. This eliminates the injection of chlorine dioxide gas into the pool while swimmers are present.

As used herein, the term "chlorite ion donor" and "chlorite donor" is a compound that comprises an alkali metal salt comprising chlorite anions $ClO_2^-$, chlorine dioxide, or any convenient direct or indirect source of chlorite anions. For example, chlorine dioxide can indirectly produce chlorite due to reduction in an aqueous system. Sodium chlorite directly supplies chlorite anions.

As used herein, the term "chlorite ion" and "chlorite anion" (also referred to as "chlorite") comprises chlorite having the general formula $ClO_2^-$. The chlorite is the anion released when sodium chlorite is dissolved in water and converts to chlorine dioxide.

As used herein, the term "recycled" means at least some portion of the recovered bromide ions and chlorite ions are regenerated to their respective oxyhalogen compounds, followed by reduction back to their respective anions, and where the process is repeated.

As used herein, the term "Cryptosporidium" is used to represent any form of parasitic microbiological organism from the family of Cryptosporidium. An example of Cryptosporidium is Cryptosporidium parvum (also referred to as C. parvum, C. parvum and Cryptosporidium parvum). Other examples of Cryptosporidium include but are not limited to: C. hominis, C. canis, C. felis, C. meleagridis, and C. muris. It is to be noted that inclusion or exclusion of italic characters or print when referring to Cryptosporidium or any of its many variants does not in any way detract from its intended descriptive meaning.

As used herein, the term "microbiological organisms" is used with reference to all forms of microbiological life including: parasites, bacteria, viruses, algae, fungus, and organisms encased in biofilms.

As used herein, "parasites" includes any species of organism including Cryptosporidium, Giardia and Ameba that can be transferred to humans by water and cause waterborne parasitic disease in humans.

As used herein, the term "inactivation" is used with reference to the ability to deactivate, kill, or destroy microbiological organisms.

As used herein, "remediation" is defined as the ability to reduce the level of waterborne pathogens and/or algae to levels at or below that deemed acceptable by various regulatory agencies exemplified by State and local Departments of Health, U.S. Environmental Protection Agency, and/or the Centers for Disease Control and Prevention. Examples of achieving remediation comprise at least one of the following: less than 1 CFU per ml of viable bacteria determined by heterotrophic plate count; greater than or equal to a 3-log reduction of parasites, and/or rendering the aqueous system free of algae.

As used herein, "programmable controller" 24 describes a control system comprising at least a microprocessor and/or programmable logic controllers (PLC) with relays and interfaces with sensors and chemical feed systems. The operations described herein can be implemented as executable code stored on a computer or machine readable non-transitory tangible storage medium in communication with the microprocessor.

Non-limiting examples of how the programmable controller 24 can be used to control chemical feed systems 40 includes: actuating chemical feed; varying the rate of chemical feed; energizing an electronic device such as a chemical feed pump, solenoid valve; stopping chemical feed; and initiating a neutralization cycle that removes residual chemicals from the water using neutralizing chemicals exemplified by sodium sulfite. The programmable controller 24 receives inputs either manually and/or automatically from sensors exemplified by the non-limiting examples: pH sensor 12, ORP sensor 8, amperometric sensor 10, chlorine dioxide sensor 14, temperature sensor 16, flow sensor 17, flow switch and the like.

The programmable controller 24 uses some form of control logic to control and optimize the feed of chemicals. Examples of control logic include: time-proportional, proportional, derivative, integral, proportional-integral-derivative control.

As used herein, "fluid contact" describes contact between conduits 32, 33 capable of transporting liquid to and from the main body of water (i.e. swimming pool) 4 at the aquatic facility. Specifically, regarding aquatic facilities, sensors and chemical feed systems 40 are in fluid contact with the water 4 of an aquatic facility in or near the mechanical room where water is recovered from the pool, filtered 20, sometime heated 22 and returned to the pool. The piping (conduit) 36 transporting the water supplies water for the sensors to monitor the various parameters such as pH 12, sanitizer concentration 8, 10, temperature 16 and chlorine dioxide 14. Chemical feed 40 is generally applied into the return piping 33 after being filtered and where applicable heated to prevent corrosion of the heater 22.

As used herein, "chemical feed systems" 40 describe any convenient device that is fluid contact with both the chemicals and the water of the aquatic facility. The chemical feed systems 40 can be controlled to deliver the desired amount of chemicals exemplified by the non-limiting examples chlorine, bromine, acid such as HCl or $CO_2$ and sodium chlorite. Non-limiting examples of chemical feed systems include: chemical metering pumps, educators, modulating control valves, electrolysis device and the like.

As used herein, "flow sensor" 17 describes a device that can detect a liquid flowing through a pipe or conduit 36. The flow sensor 17 can be a flow transmitter that measures the flow rate, but is not required to measure the flow rate. The flow sensor 17 detects motive water in the pipe or conduit 36. One non-limiting example of a flow sensor that does not measure the flow rate is a Rotorflow® Flow Sensor available by Gems™ Sensors and Controls.

As used herein, "versatile control" describes the ability of the integrated process control system to select and implement the method of chemical application to sustain the respective mixed halogen-based treatment concentrations within the set ranges of chlorine dioxide and free halogen. For example, the integrated chemical feed system can apply both chlorine dioxide and free halogen by implementing accelerated in-situ generation of chlorine dioxide, thereby increasing the concentrations of both treatments. However, during daytime hours, chlorine dioxide concentration can be increased by utilizing UV activated chlorite or the cyclic process in the event of an indoor pool. Free halogen can be increased independently by applying free halogen donor. The programmable controller is configured to select and choose the method of application to achieve the desired affect, then actuates the chemical feed systems necessary to apply the selected treatment(s).

As used herein, "energize" and "energizing" and its variations describes the activation of an electrical device by closing a circuit that delivers an electrical current to the electrical device so that the electrical device performs a desired function. For example, a flow sensor detects motive water followed by the control panel energizing the chemical feed systems. In contrast, when motive water is no longer confirmed by the flow sensor, the control panel stops the chemical feed systems.

As used herein, "actuated" and "actuating" and its variations is an action initiated by the control panel to cause something to happen such as initiating chemical feed, stopping chemical feed, initiating a neutralization cycle and the like.

As used herein, the term "free chlorine" describes the presence of hypochlorous acid and/or hypochlorite ions when a chlorine donor is dissolved in water. The predominant species of free chlorine is dependent on the pH of the water. At pool water pH of 7.2 to 7.8 free chlorine comprises both hypochlorous acid (HOCl) and hypochlorite ions (OCl—). However, when the pH is lowered with acid such as in the case of applying the accelerated in-situ generation of chlorine dioxide, the predominant species of free chlorine in the conduit of the circulating system is hypochlorous acid (HOCl). Sources of free chlorine include sodium hypochlorite, calcium hypochlorite, dichloroisocyanuric acid, trichloroisocyanuric acid, lithium hypochlorite as well as electrolysis devices the convert chloride ions to free chlorine in water.

As used herein, the term "free bromine" is used with reference to the formation or presence of hypobromous acid and possibly some portion of hypobromite ions, depending on the pH. At pool water pH most of the free bromine is hypobromous acid.

As used herein, the term "free halogen" is used with reference to a halogen-based sanitizer that hydrolyses into various halogen-based species when dissolved in water. Chlorine based free halogen comprises HOCl, and $OCl^-$ (also referred to as free chlorine) when a chlorine donor is dissolved in water at pool water pH (7.2-7.8). Bromine based free halogen forms HOBr, and $OBr^-$ (also referred to as free bromine), when a bromine donor is dissolved in water at pool water pH.

As used herein, the term "oxidizer" is used to describe a chemical capable of oxidizing bromide ions to form free bromine and/or chloride ions to free chlorine. The oxidizer can comprise bromide ions and/or free bromine. The oxidizer can be a sanitizer exemplified by calcium hypochlorite, sodium hypochlorite, lithium hypochlorite and the like. One non-limiting example of an oxidizer comprising bromide ion donor is TowerBrom® 90M sold by Occidental Chemical Corporation. Other non-limiting examples of oxidizers include potassium monopersulfate, trichloroisocyanurate, dichloroisocyanurate, 1-Bromo-3-chloro-5,5-dimethylhydantoin and the like. Electrolysis of chloride ions to produce free chlorine is also a suitable oxidizer.

As used herein, the term "inactivation" is used with reference to the ability to deactivate, kill, or destroy microbiological organisms.

As used herein, the term "microbiological organisms" is used with reference to all forms of microbiological life forms including: parasites, bacteria, viruses, algae, fungus, and organisms encased in biofilms.

As used herein, "sensor for controlling the feed of sanitizer" is used with reference to ORP and/or amperometric sensors that are in fluid contact with the water of an aquatic facility, and provide measurements used for controlling the feed of a sanitizer (e.g. chlorine and/or bromine). While only one sensor is used to control the sanitizer at any given time, it is beneficial to monitor both ORP and free chlorine.

As used herein, "amperometric sensor" 10 describes a device that is in fluid contact with the water of an aquatic facility and is used to measure the concentration of sanitizer exemplified by free chlorine. The amperometric sensor 10 can be used to control the feed of sanitizer.

As used herein, "chlorine dioxide sensor" 14 describes a device that is in fluid contact with the water 4 of an aquatic facility and is used to measure the chlorine dioxide concentrated used to remediate the aquatic facility. Generally, the chlorine dioxide sensor 14 is an amperometric sensor that incorporates a gas permeable membrane that allows chlorine dioxide gas to permeate the membrane while isolating the sensor from hydrolyzed oxidizers like chlorine. The chlorine dioxide sensor 14 can be any suitable sensor that can be used to selectively measure the chlorine dioxide. One example of another type of chlorine dioxide sensor is a colorimetric device that utilizes lissamine green reagents to selectively measure chlorine dioxide in the presence of sanitizers.

As used herein, "ORP sensor" 8 describes a device that is in fluid contact with the water of an aquatic facility and is used to measure the Oxidation Reduction Potential (ORP) of the water 4. ORP sensor 8 can be sued to control the feed of sanitizer. The ORP sensor does not directly measure the presence of free halogen. The ORP sensor is influenced by contaminants in the water that impart an oxidant demand on the free halogen. Therefore, ORP is a means of determining the "relative concentration" of free halogen in the water. However, ORP is a very effective means of controlling the free halogen concentration for use as a sanitizer.

As used herein, "chemical feed systems" 40 describes in broad terms any desirable means for applying chemicals to the water 4 of an aquatic facility. Non-limiting examples of chemical feed systems include: chemical metering pumps, educators, erosion feeders such as a chlorinator or brominator.

As used herein, "Heterotrophic plate count (HPC) is also known by a number of other names, including standard plate count, total plate count, total viable count or aerobic quality count. HPC does not differentiate between the types of bacteria present nor does HPC indicate the total number of bacteria present in the water-only those capable of forming visible colonies under specified conditions on certain non-selective microbiological media. Varying the incubation temperature will favor the growth of different groups of bacteria. As HPC gives more meaningful information about pathogenic (disease-causing) bacteria, 35° C. (or 37° C.) is the preferred incubation temperature. HPC does not necessarily indicate microbiological safety as the bacteria isolated may not have been faecally-derived but HPC does give a measure of the overall general quality of the pool water, and whether the filtration and disinfection systems are operating satisfactorily. Results reported by the laboratory are traditionally expressed as colony forming units per millilitre (CFU/mL) which equates to the number of bacteria in each millilitre of the original sample of water. A HPC count of less than 1 CFU/mL indicates that the disinfection system is effective. If the count is between 10 and 100 CFU/mL, a routine investigation should be conducted as soon as possible to ensure that all the management operations are functioning properly.

As used herein, "CFU" (Colony Forming Units) is a unit used in microbiology to estimate the number of viable bacteria or fungal cells in a sample.

Algorithms can be programmed into the programmable controller for achieving compliance with the Dept of Health regulations for swimming pool water quality. Once the sensors detect the swimming pool water is within the compliance, programmable controller can notify the appropriate personnel that the pool is ready for use by patrons. Controller display can signal the pool is ready for opening and/or remote communications can notify managers via a call or an app to their phones or computers.

EXAMPLE

A 9,000 gallon outdoor swimming pool in Naples, Florida was used as a test site to demonstrate the continuous treatment using mixed halogen-based treatment.

The swimming pool was equipped with a BECS Sys5 controller acquired from BECS Technology, Inc. located in Saint Louis, Missouri. The System 5 controller comprised ORP, pH, amperometric and temperature sensors. A chlorine dioxide sensor with flow-cell was integrated with the BECS Sys5. The Sys5 was programmed to implement the accelerated in-situ generation of chlorine dioxide, as well as configured to apply a solution of sodium chlorite when chlorine dioxide was required during day time hours of operation for the UV activation of chlorite. The free halogen concentration was controlled based on the amperometric free chlorine sensor feedback to the programmable controller. The free chlorine concentration was sustained by feeding either chlorine donor (sodium hypochlorite) or with application of chlorine dioxide using the accelerated in-situ generation of chlorine dioxide, the effluent solution from the conduit comprising residual free chlorine. Chlorine dioxide was applied using either accelerated in-situ generation of chlorine dioxide in the evening hours, and UV activation of chlorite in the daytime hours. The study was conducted for 4 weeks.

Sodium hypochlorite was the sanitizer and hydrochloric acid was used for pH control. Cryptolyte® is a trademarked source of 25% active sodium chlorite solution.

The integrated process control system demonstrated the ability to control both the free chlorine and chlorine dioxide concentrations within the set ranges of 0.2 to 0.6 ppm as $ClO_2$ and a free chlorine concentration of between 0.6 to 2.0 ppm as $Cl_2$ by employing different methods of in-situ generation of chlorine dioxide while controlling the concentrations of the mixed halogen-based treatment.

Implementation of the disclosed invention can effectively eliminate 100% of microbial infections of treated water as described by the Centers for Disease Control and Prevention, while dramatically reducing DBPs and eliminating the need for costly and potentially hazardous chlorine dioxide generators. The majority of commercial Aquatic Facilities already possess most of the equipment requirements thereby being able to upgrade their facility to implement this invention at minimal expense.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for controlling a continuous treatment of water of an aquatic facility using mixed halogen-based treatment, the method comprising:
   providing a system comprising at least one sanitizer sensor for measuring a relative concentration of free halogen in the water, a pH sensor for measuring a pH of the water, a temperature sensor for measuring a temperature of the water, and a chlorine dioxide sensor for measuring a chlorine dioxide concentration in the water, the at least one sanitizer sensor, the pH sensor, the temperature sensor and the chlorine dioxide sensor being interfaced with a programmable controller;
   the programmable controller is interfaced with chemical feed systems that are in fluid contact with the water, resulting in an integrated process control system;
   the integrated process control system providing versatile control of the chlorine dioxide concentration and the free halogen concentration by:
   measuring the chlorine dioxide concentration by the chlorine dioxide sensor;
   measuring the relative concentration of free halogen by the at least one sanitizer sensor;
   comparing the chlorine dioxide concentration to a chlorine dioxide setpoint;

comparing the free halogen concentration to a free halogen setpoint;
controlling the chlorine dioxide concentration using accelerated in-situ generation of the chlorine dioxide and/or applying a chlorite donor to the water for in-situ generation of chlorine dioxide using UV activation of chlorite or hypobromous acid activation of chlorite;
controlling the free halogen concentration by applying a free halogen donor to the water, and/or using the accelerated in-situ generation of the chlorine dioxide;
wherein the accelerated in-situ generation of the chlorine dioxide comprises the integrated process control system applying an acid, the free halogen and the chlorite donor to a conduit connected to the water;
allowing the acid, the free halogen and the chlorite donor to react in the conduit to form the chlorine dioxide and residual free halogen, and
supplying the chlorine dioxide and the residual free halogen from the conduit to the water of the aquatic facility.

2. The method according to claim 1, further comprising: measuring the chlorine dioxide concentration and calculating a chlorine dioxide Ct value by the programmable controller;
sustaining the chlorine dioxide concentration between 0.1 to 1.0 ppm until a targeted chlorine dioxide Ct value is reached,
and wherein the programmable controller records a time and the chlorine dioxide Ct value reached, resets the chlorine dioxide Ct value to zero, then resumes calculating the chlorine dioxide Ct value.

3. The method according to claim 2, wherein the programmable controller uses an algorithm to calculate the chlorine dioxide Ct value comprising:

$$\text{Chlorine dioxide Ct value} = [(\Sigma X_n) \div n] \times T$$

Where:
"$X_n$" is the chlorine dioxide concentration in mg/l (or ppm) recorded at a point in time since beginning a remediation cycle;
"n" is a number of chlorine dioxide values recorded over a period of time since beginning the remediation cycle, and
"T" is the period of time (minutes) that has lapsed since beginning the remediation cycle.

4. The method according to claim 2, further comprising calculating the chlorine dioxide Ct value based on a rolling average of the chlorine dioxide concentration in the water.

5. The method according to claim 1, wherein the at least one sanitizer sensor is an ORP sensor.

6. The method according to claim 1, wherein the at least one sanitizer sensor is an amperometric sensor.

7. The method according to claim 1, wherein the chemical feed systems to apply the acid and the free halogen comprises an electrolysis device.

8. The method according to claim 1, further comprising the mixed halogen-based treatment comprising the chlorine dioxide concentration between 0.1 to 1.0 ppm measured as $ClO_2$.

9. The method according to claim 8, wherein the chlorine dioxide concentration is between 0.2 to 0.8 ppm measured as $ClO_2$.

10. The method according to claim 9, wherein the chlorine dioxide concentration is between 0.3 to 0.6 ppm measured as $ClO_2$.

11. The method according to claim 1, further comprising the mixed halogen-based treatment comprising the free halogen concentration between 0.3 to 3.0 ppm reported as $Cl_2$.

12. The method according to claim 11, wherein the free halogen concentration is between 0.4 to 2.5 ppm reported as $Cl_2$.

13. The method according to claim 12, wherein the free halogen concentration is between 0.5 to 2.0 ppm reported as $Cl_2$.

14. The method according to claim 1, wherein the free halogen comprises free chlorine.

15. The method according to claim 1, wherein the free halogen comprises free bromine.

16. The method according to claim 1, wherein the free halogen comprises both free chlorine and free bromine.

17. The method according to claim 1, wherein the accelerated in-situ generation of the chlorine dioxide comprises a molar ratio of the free halogen (reported as $Cl_2$) to the chlorite (reported as $ClO_2^-$) is between 0.5:2 to 2:1 respectively.

18. The method according to claim 17, wherein the molar ratio of the free halogen (reported as $Cl_2$) and the chlorite (reported as $ClO_2^-$) is between 0.75:2 to 1.75:1 respectively.

19. The method according to claim 18, wherein the molar ratio of the free halogen (reported as $Cl_2$) and the chlorite (reported as $ClO_2^-$) is between 1:2 to 1:1 respectively.

20. A system for controlling a continuous treatment of water of an aquatic facility using mixed halogen-based treatment, the system comprising:
at least one sanitizer sensor for measuring a relative concentration of free halogen in the water, a pH sensor for measuring a pH of the water, a temperature sensor for measuring a temperature of the water, and a chlorine dioxide sensor for measuring a chlorine dioxide concentration in the water, the at least one sanitizer sensor, the pH sensor, the temperature sensor and the chlorine dioxide sensor being interfaced with a programmable controller;
the programmable controller is interfaced with chemical feed systems that are in fluid contact with the water, resulting in an integrated process control system;
the integrated process control system providing versatile control of the chlorine dioxide concentration and the free halogen concentration by:
measuring the chlorine dioxide concentration by the chlorine dioxide sensor;
measuring the relative concentration of free halogen by the at least one sanitizer sensor;
comparing the chlorine dioxide concentration to a chlorine dioxide setpoint;
comparing the free halogen concentration to a free halogen setpoint;
controlling the chlorine dioxide concentration using accelerated in-situ generation of the chlorine dioxide and/or applying the chlorite donor to the water for in-situ generation of the chlorine dioxide using UV activation of chlorite or hypobromous acid activation of chlorite;
controlling the free halogen concentration by applying a free halogen donor to the water, and/or using the accelerated in-situ generation of chlorine dioxide;
wherein the accelerated in-situ generation of the chlorine dioxide comprises the integrated process control system applying an acid, the free halogen and the chlorite donor to a conduit connected to the water;

allowing the acid, the free halogen and the chlorite donor to react in the conduit to form the chlorine dioxide and residual free halogen, and supplying the chlorine dioxide and the residual free halogen from the conduit to the water of the aquatic facility.

\* \* \* \* \*